US012789799B2

(12) United States Patent
Tsuchiya et al.

(10) Patent No.: US 12,789,799 B2
(45) Date of Patent: Nov. 10, 2026

(54) SURROUNDINGS MONITORING DEVICE FOR VEHICLE TO WHICH TOWED VEHICLE IS ATTACHABLE

(71) Applicants: DENSO CORPORATION, Kariya-city (JP); TOYOTA JIDOSHA KABUSHIKI KAISHA, Toyota (JP); J-QuAD DYNAMICS Inc., Tokyo (JP)

(72) Inventors: Junzoh Tsuchiya, Tokyo (JP); Seiya Fujitsu, Tokyo (JP); Koji Takeuchi, Toyota (JP); Hiroki Shimazu, Nisshin (JP)

(73) Assignees: DENSO CORPORATION, Kariya-city (JP); TOYOTA JIDOSHA KABUSHIKI KAISHA, Toyota (JP); J-QuAD DYNAMICS Inc., Tokyo (JP)

( * ) Notice: Subject to any disclaimer, the term of this patent is extended or adjusted under 35 U.S.C. 154(b) by 85 days.

(21) Appl. No.: 18/883,773

(22) Filed: Sep. 12, 2024

(65) Prior Publication Data

US 2025/0002013 A1 Jan. 2, 2025

Related U.S. Application Data

(63) Continuation of application No. PCT/JP2023/005215, filed on Feb. 15, 2023.

(30) Foreign Application Priority Data

Mar. 14, 2022 (JP) ................................ 2022-039706

(51) Int. Cl.
*B60W 30/12* (2020.01)

(52) U.S. Cl.
CPC ......... *B60W 30/12* (2013.01); *B60W 2420/40* (2013.01); *B60W 2554/80* (2020.02)

(58) Field of Classification Search
CPC ............ B60W 30/12; B60W 2420/40; B60W 2554/80; G01S 13/50; G01S 13/931; G08G 1/16
See application file for complete search history.

(56) References Cited

U.S. PATENT DOCUMENTS 9,211,889 B1 12/2015 Hoetzer et al.
2014/0131977 A1* 5/2014 Yamashiro ............ G08G 1/162 280/426

(Continued)

FOREIGN PATENT DOCUMENTS

JP 2008-149764 A 7/2008
JP 2010-244128 A 10/2010
WO 1999042856 A2 8/1999

*Primary Examiner* — Sizo B Vilakazi
(74) *Attorney, Agent, or Firm* — Precision Patents, P.C.

(57) ABSTRACT

In a surroundings monitoring device for a vehicle to which a towed vehicle is attachable, a turn information acquisition unit is configured to, when a subject vehicle is turning with the towed vehicle attached to a rear of the subject vehicle, acquire turn information related to the subject vehicle and the towed vehicle. A zone setting unit is configured to set warning zones to left and right, behind the subject vehicle, and extend, based on the turn information acquired, the warning zones further rearward when the towed vehicle is attached to the rear of the subject vehicle than when there is no towed vehicle attached. A control unit is configured to, when an object is detected by a detection device in any of the warning zones set by the zone setting unit, trigger a collision-inhibiting operation for inhibiting a collision with the object to be performed.

12 Claims, 8 Drawing Sheets

(56) References Cited

U.S. PATENT DOCUMENTS

| | | | | |
|---|---|---|---|---|
| 2016/0041258 | A1 | 2/2016 | Cashler et al. | |
| 2017/0232893 | A1* | 8/2017 | Ebner | B60D 1/305<br>340/431 |
| 2017/0363727 | A1* | 12/2017 | Prasad | G08G 1/0962 |
| 2017/0363728 | A1* | 12/2017 | Prasad | G01S 13/878 |
| 2018/0061239 | A1* | 3/2018 | Prasad | G01S 13/867 |
| 2018/0326981 | A1* | 11/2018 | Nakamura | B60W 30/143 |
| 2019/0325233 | A1 | 10/2019 | Broll et al. | |
| 2022/0027644 | A1* | 1/2022 | Gali | G06T 7/80 |
| 2025/0086399 | A1* | 3/2025 | Harvey | G06Q 40/08 |

* cited by examiner

SURROUNDINGS MONITORING DEVICE FOR VEHICLE TO WHICH TOWED VEHICLE IS ATTACHABLE

CROSS-REFERENCE TO RELATED APPLICATION

This application is a continuation application of International Application No. PCT/JP2023/005215 filed Feb. 15, 2023 which designated the U.S. and claims priority to Japanese Patent Application No. 2022-039706 filed Mar. 14, 2022, the contents of each of which are incorporated herein by reference.

BACKGROUND

Technical Field

This disclosure is related to surroundings monitoring devices.

Related Art

A known surroundings monitoring device sets warning zones to the left and right, behind a subject vehicle and performs collision-inhibiting operations, such as notifying a driver of the subject vehicle of the presence of another vehicle, when the other vehicle is detected within any of the warning zones. Such a function of the surroundings monitoring device is also referred to as a blind spot monitor. There is also known a technology for extending the warning zones rearward when a towed vehicle is attached to the rear of the subject vehicle.

DESCRIPTION OF SPECIFIC EMBODIMENTS

Figure 1:
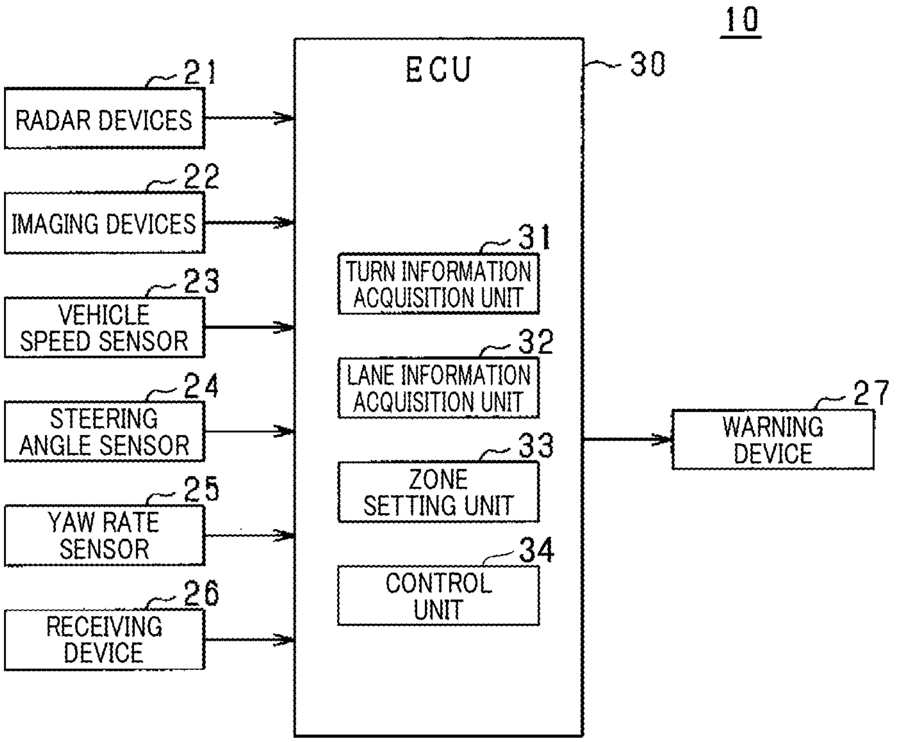
FIG. 1 is a schematic diagram of a surroundings monitoring system.

According to the above known technology, as disclosed in, for example, U.S. U.S. Pat. No. 9,211,889, when the subject vehicle makes a turn with warning zones extended rearward, the extended warning zones may be oriented to intersect with each lane of a road. Thus, there is concern that an unnecessary warning or the like may be provided as a collision-inhibiting operation. That is, when the subject vehicle makes a left turn, the warning zone to the right, behind the subject vehicle may extend not only to the adjacent lane to the subject vehicle's lane but also to the next-to-adjacent lane to the subject vehicle's lane, which may cause an unnecessary warning in response to another vehicle traveling in the next-to-adjacent lane. In addition, the warning zone to the left, behind the subject vehicle may overlap the subject vehicle's lane, which may cause an unnecessary warning or the like in response to another vehicle traveling behind the subject vehicle or a towed vehicle attached to the subject vehicle.

In view of the foregoing, it is desired to have a surroundings monitoring device capable of inhibiting unnecessary collision-inhibiting operations in a vehicle having a towed vehicle attached thereto.

One aspect of the present disclosure provides a surroundings monitoring device for a vehicle to which a towed vehicle is attachable. In the surroundings monitoring device, a turn information acquisition unit is configured to, when a subject vehicle is turning with the towed vehicle attached to a rear of the subject vehicle, acquire turn information related to the subject vehicle and the towed vehicle. The subject vehicle is a vehicle that the surroundings monitoring device is applied to. A zone setting unit is configured to set warning zones to left and right, behind the subject vehicle, and extend, based on the turn information acquired by the turn information acquisition unit, the warning zones further rearward when the towed vehicle is attached to the rear of the subject vehicle than when there is no towed vehicle attached. A control unit is configured to, when an object is detected by a detection device in any of the warning zones set by the zone setting unit, trigger a collision-inhibiting operation for inhibiting a collision with the object to be performed.

In the above configuration, for example, when there is another vehicle approaching the subject vehicle in the adjacent lane, a collision-inhibiting operation is performed against the other vehicle. In addition, when the towed vehicle is attached to the rear of the subject vehicle, the warning zones for the collision-inhibiting operation to be performed are extended further rearward than when there is no towed vehicle attached. However, in a situation where the subject vehicle is turning, since the direction of the warning zones becomes oblique in the same or similar direction as the direction of the subject vehicle, there is concern that a defect such as the warning zones unintentionally protruding into the adjacent lane may occur, and unnecessary collision-inhibiting operations may be performed.

To address this issue, when the subject vehicle is turning with the towed vehicle attached to the rear of the subject vehicle, the turn information for both the subject vehicle and towed vehicle is acquired, and the warning zones are set based on this turn information. This makes it possible to prevent unnecessary collision-inhibiting operations from being performed in unintended areas during a turn of the subject vehicle with the towed vehicle attached, even when the direction of the warning zones becomes oblique in accordance with the direction of the subject vehicle. Therefore, for vehicles with a towed vehicle attached, this can prevent unnecessary collision-inhibiting operations from being performed.

First Embodiment

Hereinafter, the surroundings monitoring device according to one embodiment of the present disclosure will now be described with reference to the accompanying drawings.

As illustrated in FIG. 1, a surroundings monitoring system 10 according to the present embodiment includes radar devices 21, imaging devices 22, a vehicle speed sensor 23, a steering angle sensor 24, a yaw rate sensor 25, a receiving device 26, a warning device 27, and an electronic control unit (ECU) 30. In the present embodiment, each radar device 21 corresponds to a detection device, and the ECU 30 corresponds to the surroundings monitoring device.

Each radar device 21 is, for example, a known millimeter-wave radar that transmits high-frequency signals in the millimeter wave band as transmission waves. The radar device 21 is, for example, installed at the rear end of the subject vehicle, and detects positions of objects within a detection coverage that is an area falling within a predefined detection angle. Specifically, the radar device 21 transmits a probe wave every predefined cycle and receives reflected waves using a plurality of antennas. The radar device 21 calculates a distance to an object based on the transmission time of the probe wave and the reception time of the reflected wave. The radar device 21 calculates a relative speed based on the frequency, which changes due to the Doppler effect, of the reflected wave reflected by the object. In addition, the radar device 21 may calculate a direction of the object based on a phase difference between the reflected waves received by the plurality of antennas. Calculating the position and direction of the object allows a relative position of the object relative to the subject vehicle to be determined. The radar device 21 corresponds to a ranging sensor.

Figure 2:
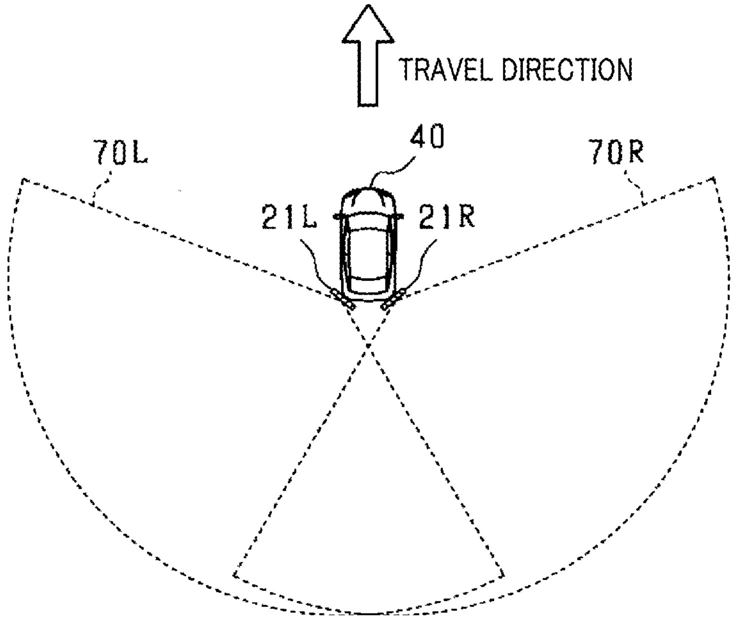
FIG. 2 is an illustration of a detection area around a subject vehicle.

As illustrated in FIG. 2, the radar devices 21 are installed on the rear end of the subject vehicle 40, one on each side, and detect objects to the left and right, behind the subject vehicle 40, as well as objects behind the subject vehicle 40. The radar device 21L installed on the left side of the rear end of the subject vehicle 40 detects objects in a detection area 70L. The radar device 21R installed on the right side of the rear end of the subject vehicle 40 detects objects in a detection area 70R.

Each imaging device 22 may be a monocular camera, such as a CCD camera, CMOS image sensor, or near-infrared camera, or may be a stereo camera. The number of imaging devices 22 may be one or more. For example, the imaging device 22 is installed at a predefined height in the center of the lateral direction of the subject vehicle, and captures images of a forward or rearward area that horizontally spans a predefined angular range, from an overhead perspective. The imaging device 22 sequentially outputs the captured images to the ECU 30.

The vehicle speed sensor 23 is a sensor that detects a travel speed of the subject vehicle 40, and outputs a travel speed signal according to the travel speed of the subject vehicle 40 to the ECU 30. The steering angle sensor 24 is a sensor that detects a steering angle of a steering wheel, and outputs a steering angle signal according to a change in the steering angle to the ECU 30. The yaw rate sensor 25 is a sensor that detects a turning angular speed of the subject vehicle 40, and outputs a yaw rate signal according to the turn angular speed of the subject vehicle 40 to the ECU 30.

The receiving device 26 is a receiving device for receiving positioning signals from a satellite positioning system, for example, a GPS receiver. The receiving device 26 receives positioning signals according to the current location of the subject vehicle 40, and outputs the received positioning signals to the ECU 30.

The warning device 27 is a device for providing a warning to the driver or the like, and may include, for example, a device that provides an auditory warning, such as a speaker or buzzer installed in the cabin of the subject vehicle 40, or a device that provides a visual warning, such as a display, but is not limited to such devices. For example, the warning device 27 may notify the driver that there is a risk of collision with an object by outputting a warning sound or the like based on a control command from the ECU 30.

The functions of the ECU 30 may be implemented by software stored in a tangible memory device and a computer that executes the software, by software alone, by hardware alone, or by any combination thereof. For example, in cases where the ECU 30 is provided by hardware electronic circuitry, the ECU 30 may be provided by digital circuitry including a large number of logic circuits or by analog circuitry. For example, the ECU 30 executes programs stored in a non-transitory tangible storage medium as its own storage unit. The programs include programs for the processes described later. Executing each program allows a method corresponding to the program to be implemented. The storage unit is, for example, a non-volatile memory. In addition, the programs stored in the storage unit may be updated via a network such as the internet.

The ECU 30 has a so-called blind spot monitoring function, and sets warning zones 71 to the left and right, behind the subject vehicle 40. When an object is detected in any of these warning zones by any of the radar devices 21, a collision-inhibiting operation is performed to inhibit a collision with the object. In the present embodiment, the collision-inhibiting operation is performed by the warning device 27. The warning zones 71 are set as zones that are located to the left and right, behind the subject vehicle and that overlap with the detection areas 70 (70L, 70R) of the radar devices 21. In the present embodiment, the warning zones 71 are set so that portions of them extend outside the respective detection areas 70. Objects subject to the collision-inhibiting operation include vehicles such as four-wheeled cars, motorcycles, bicycles, as well as pedestrians.

Figure 3A:
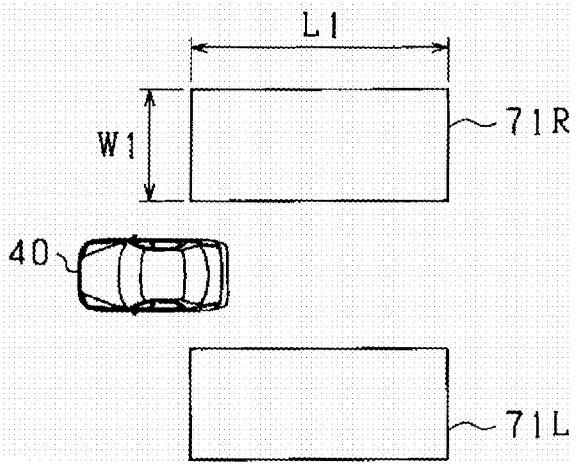
FIGS. 3A and 3B are illustrations for setting warning zones.

The warning zones 71 will now be described in detail. As illustrated in FIG. 3A, the ECU 30 sets the warning zones 71L and 71R, as the warning zones 71, to the left and right of the subject vehicle 40, respectively. Each of the warning zones 71L and 71R is provided so as to, in the longitudinal direction of the subject vehicle 40, overlap a portion of the rear end of the subject vehicle 40 and extend rearward therefrom. The length in the longitudinal direction is L1, and the width in the lateral direction is W1. Each of the left and right warning zones 71L and 71R has the same shape and the same size. The length L1 of each of the warning zones 71L and 71R is, for example, around 5 to 10 meters. The width W1 of each of the warning zones 71R and 71L may be set to a fixed value according to the width (specified width) of the adjacent lane to the lane in which the subject vehicle 40 is traveling. The width W1 may be determined by taking into account the fact that the road width differs from country to country or region to region. In addition, in cases where the width of the adjacent lane is recognized by the captured images from the imaging devices 22 or map information, the width W1 may be set according to the width of the adjacent lane. The warning zones 71L and 71R may be provided so as to extend rearward from the rear end of the subject vehicle 40.

Figure 3B:
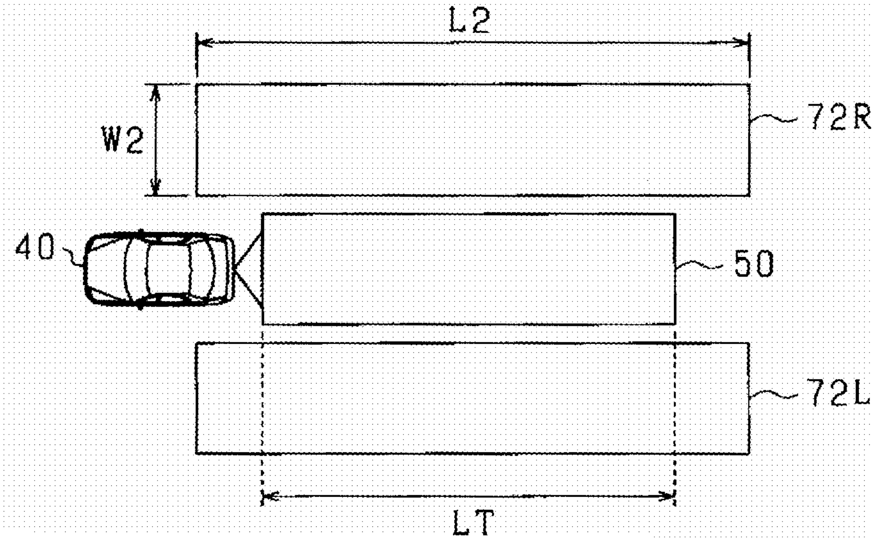

A towed vehicle may be attached to the rear of the subject vehicle 40. In the present embodiment, it is assumed that a trailer 50, as a towed vehicle, used for purposes such as cargo transport is attached to the rear of the subject vehicle 40. FIG. 3B illustrates such a situation. In this case, the ECU 30 extends the warning zones 71L and 71R in the rearward direction. Specifically, the ECU 30 acquires a trailer length LT as trailer information and extends the warning zones 71L and 71R rearward according to the trailer length LT. In this manner, the warning zones 71L and 71R are changed to the warning zones 72L and 72R.

Each of the warning zones 72L and 72R extended in such a manner has a length of L2 in the longitudinal direction and a width of W2 in the lateral direction. The length L2 of the warning zones 72L and 72R is determined so that the rear end of each of the warning zones 72L and 72R is positioned further rearward than the rear end of the trailer 50. In addition, the width W2 of the warning zones 72R and 72L is equal to the width W1 of the warning zones 71R and 71L (i.e., W1=W2).

By the way, when the subject vehicle 40 makes a turn, the direction of extension of the warning zones changes in accordance with the turn of the subject vehicle 40. In this case, the extension of the warning zones may cause the extended warning zones 72L and 72R to be oriented to intersect with each lane. Thus, there is a concern that unnecessary warnings may occur.

Figure 4:
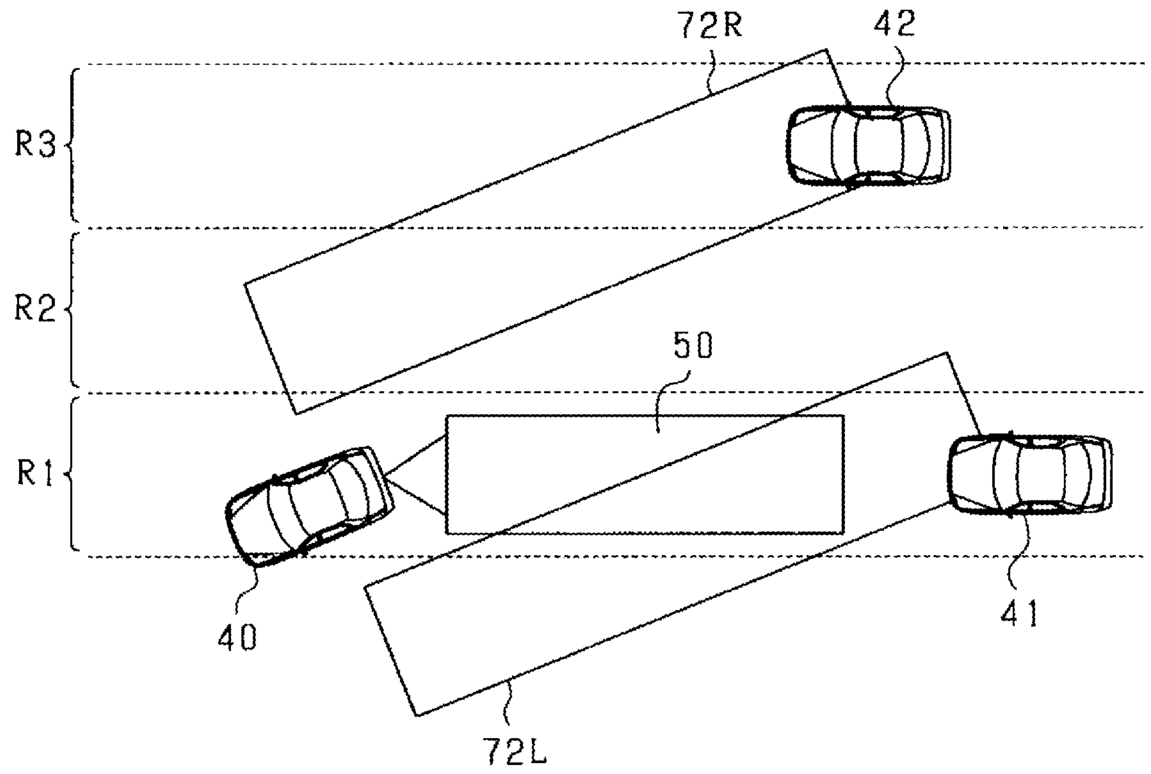
FIG. 4 is an illustration of an example situation where the subject vehicle is traveling.

This situation will now be described using FIG. 4. FIG. 4 illustrates a road with a plurality of lanes on one side including a subject vehicle's lane R1 (that is a lane in which the subject vehicle 40 is traveling), an adjacent lane R2 that is adjacent to the subject vehicle's lane R1, and a distant lane R3 (referred to as a next-to-adjacent lane) that is a lane on the opposite side of the adjacent lane R2 from the subject-vehicle's lane R1. The subject vehicle 40 with a trailer attached thereto and the other vehicle 41 are traveling in the subject vehicle's lane R1, and the other vehicle 42 is traveling in the distant lane R3.

In this situation, when the subject vehicle 40 makes a left turn, the warning zone 72L on the left side overlaps the subject vehicle's lane R1, which may cause an unnecessary warning in response to the other vehicle 41 traveling in the subject vehicle's lane R1. In addition, an unnecessary warning may be caused in response to the trailer 50 attached to the subject vehicle 40. Furthermore, the warning zone 72R on the right side overlapping the distant lane R3 (that is, the next-to-adjacent lane on the opposite side from the turning direction of the subject vehicle 40) may cause an unnecessary warning in response to the other vehicle 42 traveling in the distant lane R3.

As such, the surroundings monitoring system 10 of the present embodiment is configured as follows in order to inhibit unnecessary collision-inhibiting operations when a vehicle with a trailer 50 attached thereto makes a turn. Specifically, as illustrated in FIG. 1, the ECU 30 includes a turn information acquisition unit 31, a lane information acquisition unit 32, a warning zone setting unit 33, and a control unit 34.

The turn information acquisition unit 31 acquires turn information for the subject vehicle 40 and the trailer 50 when the subject vehicle 40 is turning with the trailer 50 attached to the rear of the subject vehicle 40. The turn information acquisition unit 31 acquires, as the turn information, position information of the trailer 50 that changes as the subject vehicle 40 turns and the travel trajectory of the vehicle 40 when the subject vehicle 40 is turning.

The position of the trailer 50 is calculated based on results of detection by the radar devices 21. Specifically, the position of the trailer 50 is calculated based on detection points corresponding to the trailer 50 detected by the radar devices 21. The travel trajectory of the subject vehicle 40 is calculated based on the history of the location of the subject vehicle 40. Specifically, the travel trajectory of the subject vehicle 40 is calculated by connecting the stored locations of the vehicle 40 in chronological order.

The turn information may include information based on which it is determined that the subject vehicle 40 is turning. In this case, for example, the turn radius of the subject vehicle 40 calculated based on the steering angle and the yaw rate may be used to determine that the subject vehicle 40 is turning, when the turn radius is less than a predefined value. However, the determination method may be arbitrary.

The lane information acquisition unit 32 acquires lane information related to lanes of the road on which the subject vehicle 40 is traveling. Specifically, the lane information acquisition unit 32 acquires, based on images acquired from the imaging devices 22, locations of the demarcation lines that demarcate the subject vehicle's lane R1 and the adjacent lane R2 as lane information.

Figure 5:
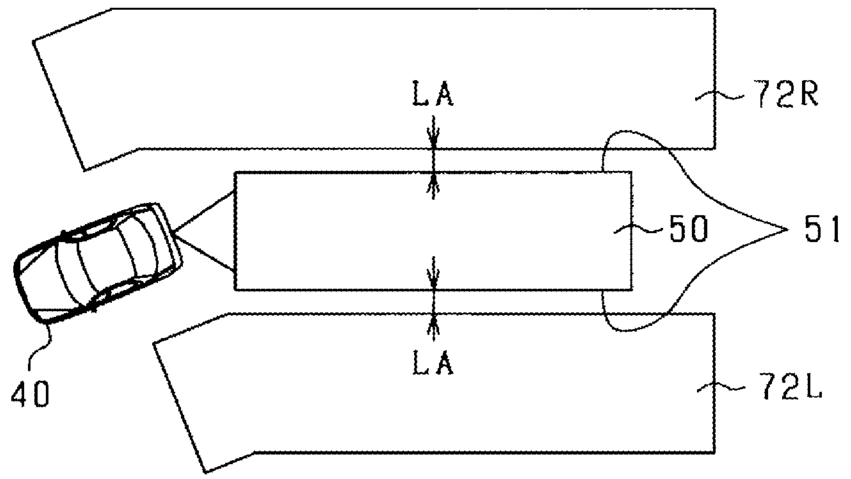
FIG. 5 is an illustration of a process of setting warning zones.
Figure 6:
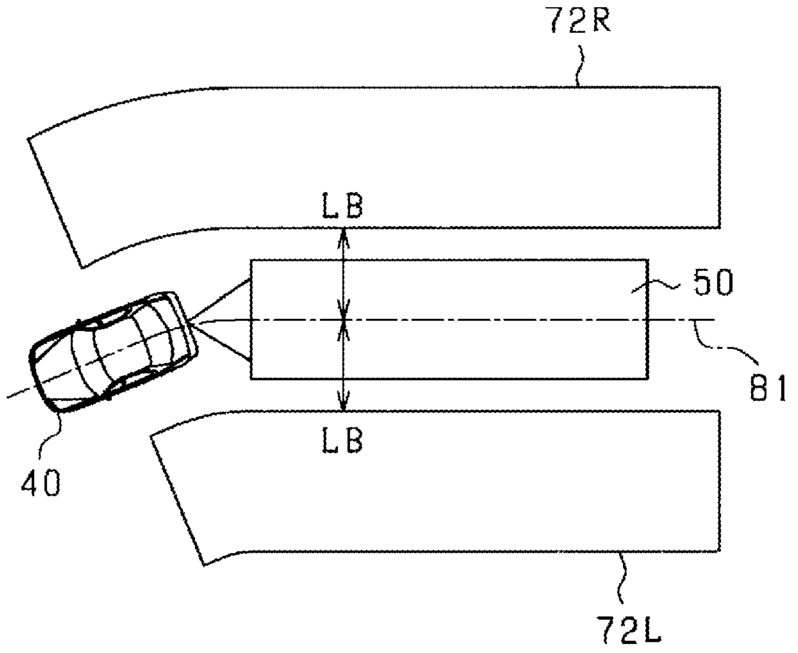
FIG. 6 is an illustration of a process of setting warning zones.
Figure 7:
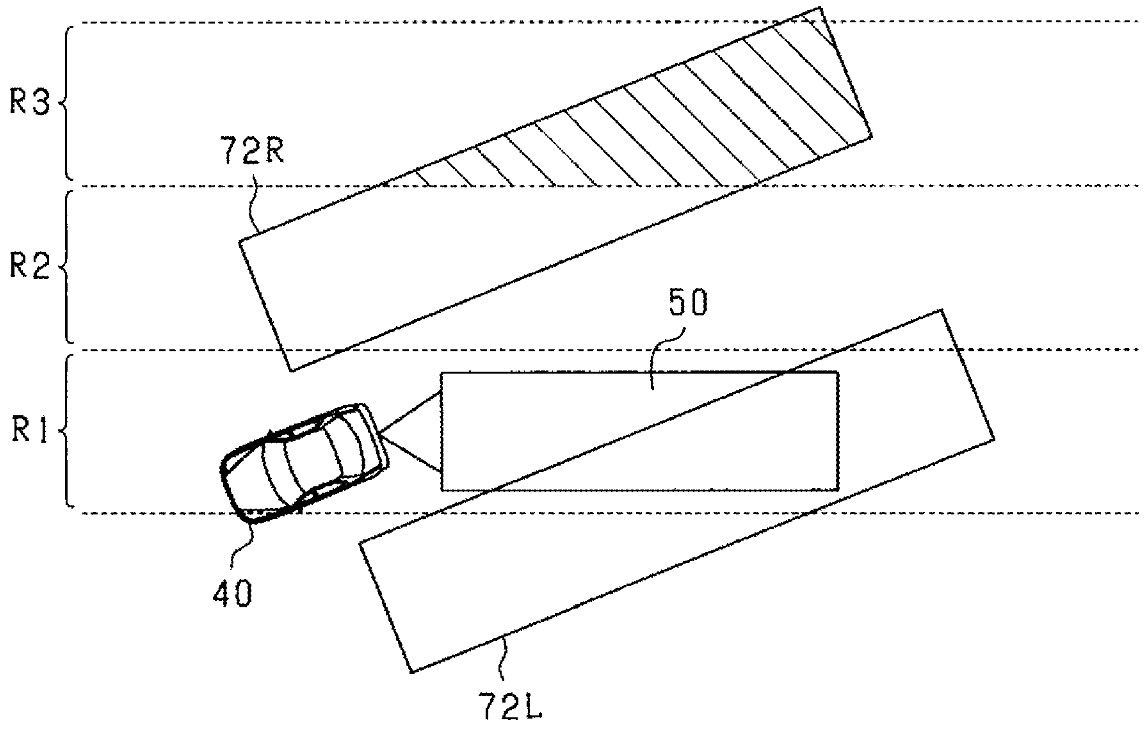
FIG. 7 is an illustration of a process of restricting implementation of a collision-inhibiting operation.
Figure 8:
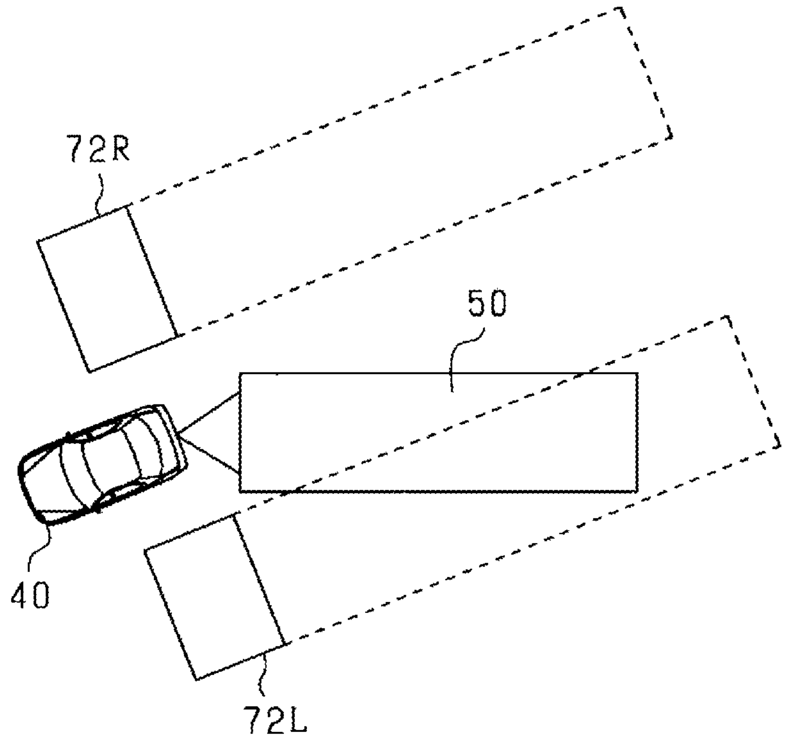
FIG. 8 is an illustration of a process of setting warning zones.

The warning zone setting unit 33 sets the warning zones 72L, 72R based on the turn information acquired by the turn information acquisition unit 31 and the lane information acquired by the lane information acquisition unit 32. The warning zones 72L, 72R set by the warning zone setting unit 33 will now be described in detail. FIGS. to 8 illustrate the warning zones 72L, 72R when the subject vehicle 40 transitions from a straight running state to a turning state in which the vehicle turns to the left of the travel direction. The process of setting the warning zones 72L, 72R as illustrated in FIG. 5 will now be described as a first process, the process of setting the warning zones 72L, 72R as illustrated in FIG. 6 as a second process, the process of setting the warning zones 72L, 72R as illustrated in FIG. 7 as a third process, the process of setting the warning zones 72L, 72R as illustrated in FIG. 8 as a fourth process. In each of FIGS. 5 to 8, the trailer 50 is oblique with respect to the longitudinal direction of the subject vehicle 40.

In the first process, the warning zones 72L, 72R are set based on the position of the trailer 50 acquired by the turn information acquisition unit 31, as illustrated in FIG. 5. In this case, with reference to the position of the trailer 50, the warning zones 72L, 72R are set to be separated by a predefined lateral distance LA from the respective sides 51 of the trailer 50. This allows the warning zones 72L, 72R to be set in correspondence to the position of the trailer 50, which changes as the subject vehicle turns.

In the second process, the warning zones 72R, 72L are set based on the travel trajectory 81 of the subject vehicle 40 acquired by the turn information acquisition unit 31, as illustrated in FIG. 6. In this case, with reference to the travel trajectory 81 at the lateral center of the subject vehicle 40, the warning zones 72L and 72R are set to extend along the travel trajectory 81 and to be separated by a predefined distance LB from the travel trajectory 81 in a direction perpendicular to the travel trajectory 81. This allows the warning zones 72L, 72R to be set in correspondence to the trailer 50 following the subject vehicle 40 during a turn of the vehicle 40.

In the third process, as illustrated in FIG. 7, the warning zones 72R, 72L are set based on the lane information acquired by the lane information acquisition unit 32. In this case, the warning zones 72R, 72L after extension of the warning zones 71L, 71R are set to exclude an area overlapping the distant lane R3 (on the opposite side of the adjacent lane R2 from the subject vehicle's lane R1). That is, the area of any of the extended warning zones 72R, 72L, on the opposite side of the adjacent lane R2 from the subject vehicle's lane (the shaded area in FIG. 7), is a restriction area where implementation of the collision-inhibiting operation is restricted. This can suppress unnecessary collision-inhibiting operations in the distant lane R3, even when the direction of the warning zones 72L, 72R is oblique with respect to each lane during a turn of the vehicle 40.

In the fourth process, as illustrated in FIG. 8, the warning zones 72L and 72R after extension of the warning zones 71L and 71R are set to have their rear end portions truncated. This can suppress unnecessary collision-inhibiting operations in the subject vehicle's lane R1 and the distant lane R3, even when the direction of the warning zones 72L, 72R is oblique with respect to each lane during a turn of the subject vehicle 40.

In a situation where the subject vehicle 40 is turning with the trailer 50 attached to the rear of the subject vehicle 40, the warning zone setting unit 33 sets the warning zones 72L and 72R by any of the first through fourth processes (processes shown in FIGS. 5 through 8) based on the position of the trailer 50 and the travel trajectory of the subject vehicle 40 as the turn information, and the lane information.

Figure 9:
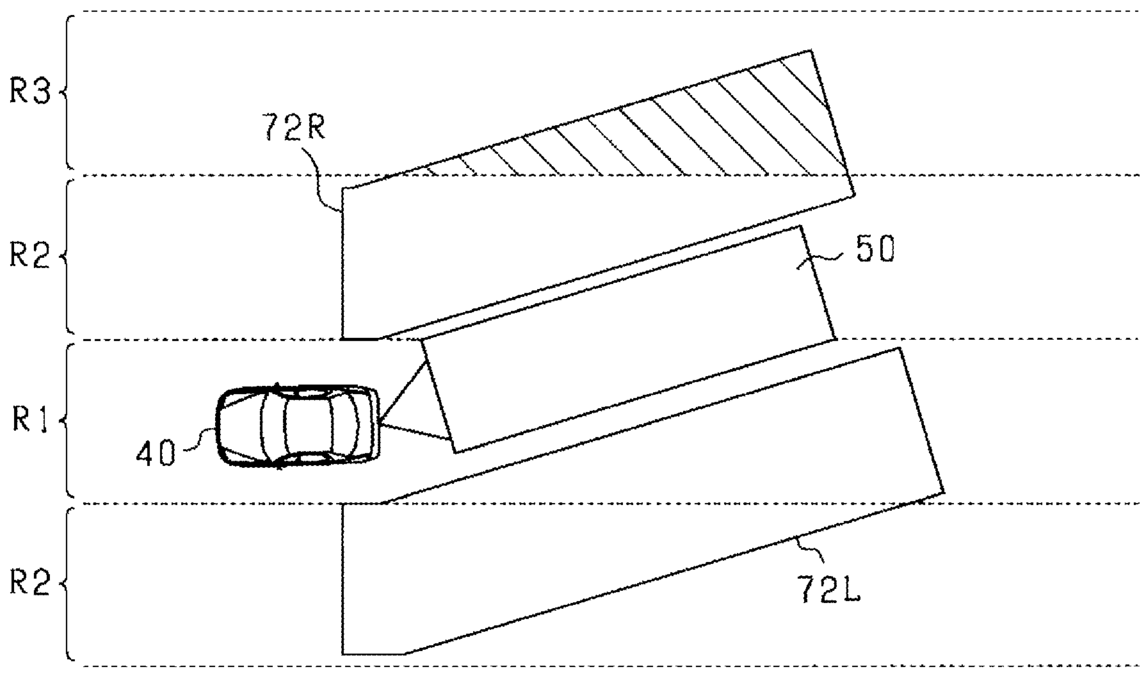
FIG. 9 is an illustration of a process of restricting implementation of the collision-inhibiting operation.

There is concern about that, for example, when the subject vehicle 40 starts to turn to make a lane change and then completes the lane change, the warning zones 72R, 72L set in the first and second processes at least partially overlap the distant lane R3 (the area on the opposite side of the adjacent lane R2 from the subject vehicle's lane), which causes unnecessary collision-inhibiting operations to be performed. Specifically, as illustrated in FIG. 9, if a portion of the warning zones 72L, 72R set in the first process overlaps the distant lane R3, unnecessary collision-inhibiting operations may be performed. The same is true in the case where the warning zones 72L, 72R are set in the second process.

In consideration of the above, the warning zone setting unit 33 defines the area of any of the warning zones 72R, 72L set in the first or second process, on the opposite side of the adjacent lane R2 from the subject vehicle's lane (the shaded area in FIG. 9), as a restriction area where implementation of the collision-inhibiting operation is restricted. This suppresses unnecessary collision-inhibiting operations in the distant lane R3 during a turn of the subject vehicle 40.

In FIG. 9, the area of the warning zone 72L that overlaps the subject vehicle's lane R1 is an area to the side of the trailer 50. In this case, the area of the warning zone 72L that overlaps the subject vehicle's lane R1 is left as a warning zone to keep watch for other vehicles in this area.

Figure 10:
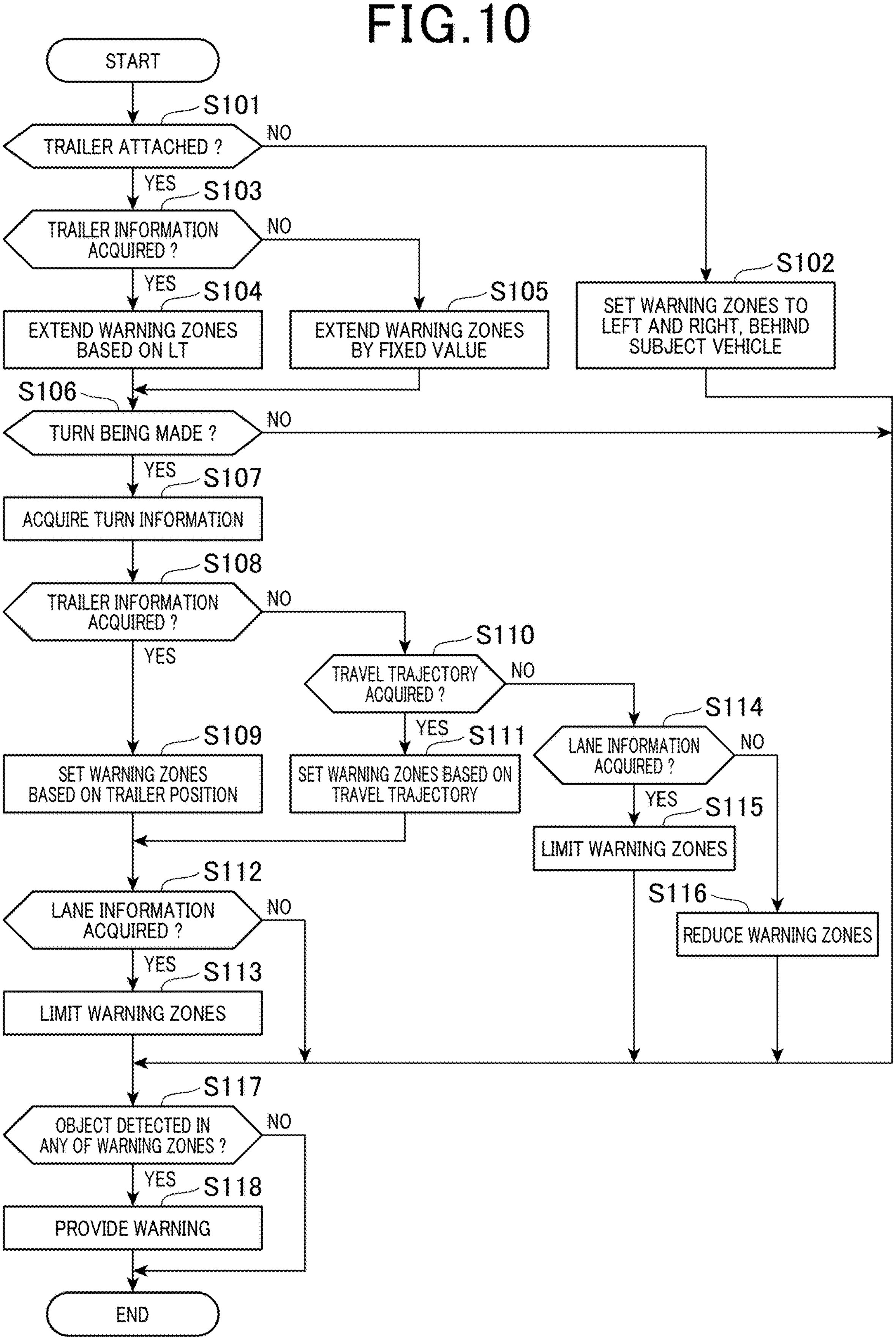
FIG. 10 is a flowchart of process steps for controlling the collision-inhibiting operation.

Control of the collision-inhibiting operation, performed by the ECU 30, will now be described with reference to the flowchart in FIG. 10. The process illustrated in FIG. 10 is performed repeatedly at predefined time intervals.

First, at step S101, the ECU 30 determines whether a trailer 50 is attached to the subject vehicle 40. If a trailer 50 is not attached to the subject vehicle 40, the ECU proceeds to step S102 and sets the normal warning zones 71R and 71L (see FIG. 3A). If a trailer 50 is attached to the subject vehicle 40, the ECU 30 extends the warning zones at steps S103 to S105.

At step S103, the ECU 30 determines whether the trailer information, including the trailer length LT, has been acquired. The method of acquiring the trailer information is arbitrary, but for example, the trailer information input by a user or the trailer information transmitted from the trailer 50 may be acquired. In an alternative configuration, the trailer length LT may be acquired by calculating the trailer length LT from results of detection by the radar devices 21. The trailer information may be type information for the trailer 50. In short, the trailer information may be any information that allows the length of the trailer to be determined.

If the trailer information has been acquired, the ECU 30 proceeds to step S104 and extends the warning zones based on the trailer length LT. If the trailer information has not been acquired, the ECU 30 proceeds to step S105 and extends the warning zones by a predefined value. For example, the warning zones may be extended by a fixed length, such as 10 m or 5 m. At step S104 or S105, the normal warning zones 71R and 71L are thus changed to the warning zones 72L and 72R (see FIG. 3B).

At step S106, the ECU 30 determines whether the subject vehicle 40 is turning. Whether the subject vehicle 40 is turning may be determined using any method. For example, if the turn radius R of the subject vehicle is less than a threshold radius, it may be determined that the subject vehicle 40 is turning.

If it is determined that the subject vehicle 40 is turning, the ECU 30 proceeds to step S107 and acquires the turn information. Specifically, the turn information includes the position of the trailer 50 and the travel trajectory of the subject vehicle 40 during a turn of the subject vehicle 40.

At step S108, the ECU 30 determines whether the position of the trailer 50 is included in the turn information acquired at step S107. If the position of the trailer 50 is included in the turn information, the ECU 30 proceeds to step S109 and sets the warning zones 72L, 72R based on the position of the trailer 50 (in the first process). If the position of the trailer 50 is not included in the turn information acquired at step S107, the ECU 30 proceeds to step S110 and determines whether the travel trajectory of the subject vehicle 40 is included in the turn information. If the travel trajectory of the subject vehicle 40 is included in the turn information, the ECU 30 proceeds to step S111 and sets the warning zones 72L and 72R based on the travel trajectory of the subject vehicle 40 (in the second process).

At steps S108 to S111, the zone setting using the first process (zone setting based on the position of the trailer) is given priority over the zone setting using the second process (zone setting based on the travel trajectory of the subject vehicle). That is, when both the position of the trailer and the travel trajectory of the subject vehicle are acquired as the turn information, the zone setting based on the position of the trailer is given priority over the zone setting based on the travel trajectory of the subject vehicle. The reason is as follows.

Figure 11:
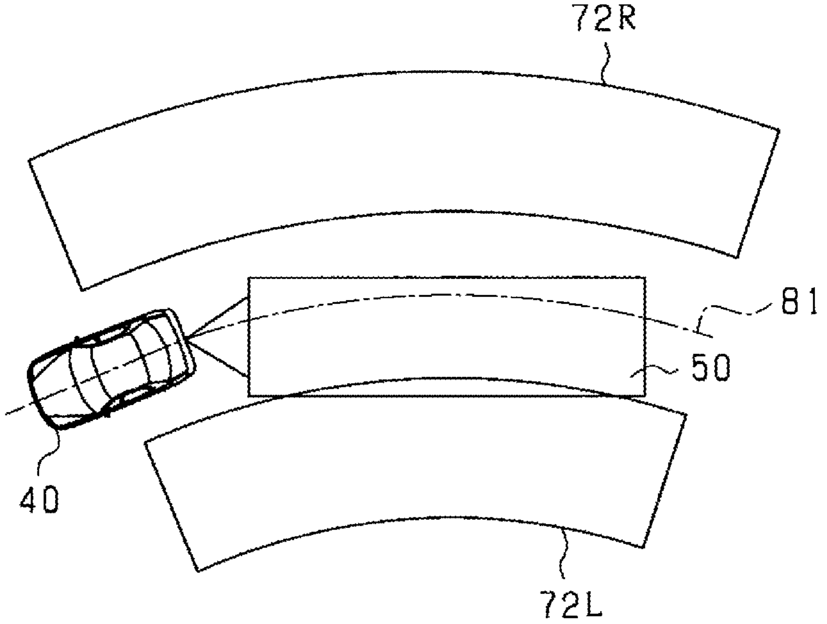
FIG. 11 is an illustration of an example situation where the subject vehicle is traveling.

In the first process, since the warning zones 72L and 72R are set based on the position of the trailer, no situation occurs in which the trailer 50 overlaps the warning zones 72L and 72R. In contrast, in the second process, since the warning zones 72L and 72R are set based on the travel trajectory of the subject vehicle, the trailer 50 and the warning zones 72L and 72R may overlap. For example, as illustrated in FIG. 11, if the road section where the subject vehicle 40 makes a turn becomes longer, a situation may occur where the trailer 50 overlaps the warning zones 72L and 72R set based on the travel trajectory of the subject vehicle. Therefore, in the present embodiment, the zone setting based on the position of the trailer is given priority over the zone setting based on the travel trajectory of the subject vehicle.

If the warnings zones 72L and 72R are set at either step S109 or S111, the ECU 30 proceeds to step S112 and determines whether the lane information has been acquired. If the lane information has been acquired, the ECU 30 proceeds to step S113 and performs the process of defining an area where any of the warning zones 72R and 72L overlap the distant lane R3 as a restriction area where implementation of the collision-inhibiting operation is restricted.

If the answer is NO at each of steps S108 and S110, the ECU 30 proceeds to step S114 and determines whether the lane information has been acquired. If the lane information has been acquired, the ECU 30 proceeds to step S115 and performs the process (third process) of defining an area where any of the warning zones 72R and 72L overlap the distant lane R3 as a restriction area where implementation of the collision-inhibiting operation is restricted. If no lane information has been acquired, the ECU 30 performs the process (fourth process) of truncating the rear end portion of each of the warning zones 72R and 72L in the longitudinal direction of the warning zones 72R and 72L.

At step S117, the ECU 30 determines whether an object has been detected by any of the radar devices 21 in any of the warning zones. If an object is detected in any of the warning zones, the ECU 30 proceeds to step S118 and outputs a command to the warning device 27 to provide a warning. Thereafter, the ECU 30 terminates the process. If no object is detected in any of the warning zones, the ECU 30 terminates the process without providing a warning. In the present embodiment, the control unit 34 in the ECU 30 (see FIG. 1) is responsible for performing steps S117-118.

The present embodiment described in detail above can provide the following advantages.

When the subject vehicle 40 is turning with the trailer 50 attached to the rear of the subject vehicle 40, the turn information related to the subject vehicle 40 and the trailer 50 is acquired, and the warning zones 72L, 72R are set based on the turn information. This can suppress unnecessary collision-inhibiting operations in unintended areas (that is, areas where collisions are unlikely to occur) even when the direction of the warning zones 72L and 72R becomes oblique similarly in accordance with the direction of the subject vehicle 40 when the vehicle 40 makes a turn with the trailer 50 attached thereto. Therefore, implementation of unnecessary collision-inhibiting operations can be restricted for a vehicle with a trailer 50 attached thereto.

The position of the trailer 50, which changes as the subject vehicle 40 turns, is acquired as the turn information, and the warning zones 72L, 72R are set to the respective sides of the trailer 50 based on the position of the trailer 50. In this case, the warning zones 72L, 72R are set based on the position of the trailer 50. During a turn of the subject vehicle 40, this can suppress the warning zone to the opposite side of the trailer 50 from the turn direction side from being set at a position away from that opposite side of the trailer 50, or the warning zone to the turn direction side of the trailer 50 from being set at a position such that the warning zone to the turn direction side overlaps the trailer 50, which allows the warning zones 72L, 72R to be set at appropriate positions with respect to the trailer 50.

The travel trajectory of the subject vehicle 40 during a turn is acquired as the turn information, and the warning zones 72L and 72R are set so as to extend in a direction along the acquired travel trajectory of the subject vehicle 40. In this case, the warning zones 72R, 72L are set with respect to the travel trajectory of the subject vehicle 40. This allows the warning zones 72L, 72R to be set in correspondence to the trailer 50 following the subject vehicle 40 during a turn of the vehicle 40.

When the position of the trailer 50 has been acquired as the turn information, the warning zones 72L and 72R are set based on the position of the trailer 50 (in the first process). When the position of the trailer 50 has not been acquired as the turn information but the travel trajectory of the subject vehicle has been acquired as the turn information, the warning zones 72L and 72R are set based on the travel trajectory of the subject vehicle (in the second process). This allows the process of setting the warning zones to be used differently according to whether the position of the trailer 50 has been acquired, thereby allowing the warning zones to be set according to the situation.

When neither the position of the trailer 50 nor the travel trajectory of the subject vehicle 40 has been acquired as the turn information, the process of truncating the rear end portion of each of the warning zones 72L, 72R in the longitudinal direction (the fourth process) is performed. This can suppress the warning zones 72L, 72R from overlapping the subject vehicle's lane R1 or the distant lane R3 even when neither the position of the trailer 50 nor the travel trajectory of the subject vehicle 40 has been acquired, thereby suppressing unnecessary collision-inhibiting operations from being performed in the subject vehicle's lane R1 or the distant lane R3.

The adjacent lane R2 is recognized based on the lane information related to the road on which the subject vehicle 40 is traveling, and the area of any of the warning zones 72R, 72L, on the opposite side of the adjacent lane R2 from the subject vehicle's lane, is defined as a restriction area where implementation of the collision-inhibiting operation is restricted. This can suppress unnecessary collision-inhibiting operations in the distant lane R3 from being implemented, even when the direction of the warning zones 72L, 72R is oblique with respect to each lane during a turn of the subject vehicle 40.

Second Embodiment

Figure 12:
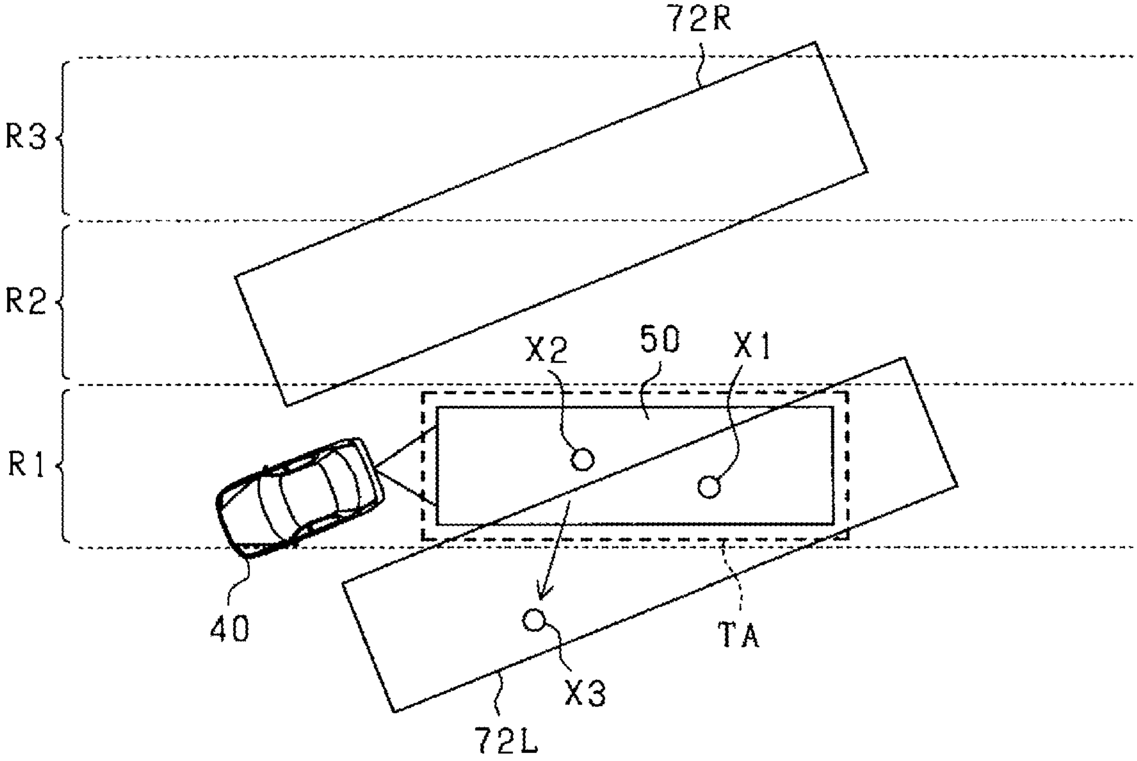
FIG. 12 is an illustration of a process of setting a trailer zone.

Next, control of the collision-inhibiting operation according to a second embodiment will now be described. In the present embodiment, as illustrated in FIG. 12, a trailer zone TA is set as an area that overlaps the trailer 50 attached to the subject vehicle 40, and no collision-inhibiting operation is performed when an object is detected in the trailer zone TA. When the subject vehicle 40 with a trailer attached thereto turns, no collision-inhibiting operation is performed even when an object is detected in an area that overlaps the trailer zone TA, of any of the warning zones 72L and 72R. For example, even in a case where an object is detected at the position X1 in FIG. 12, no collision-inhibiting operation is performed. In such a manner, implementation of the collision-inhibiting operation in the subject vehicle's lane R1 is restricted. The trailer zone TA corresponds to a towed vehicle area.

When object detection is performed by the radar devices 21, occurrence of multiple reflections of a probe wave transmitted from the radar devices 21 from the trailer 50 give rise to a risk that erroneous object detection may be performed. In addition, the multiple reflections may cause a detected position of an object to move, and the object may be recognized as moving within a radar detection area. In consideration of the above, in the present embodiment, no collision-inhibiting operation is performed when the detected object is recognized as having moved from the trailer zone TA to outside the trailer zone TA within any of the warning zones 72R, 72L. For example, when an object is recognized as having moved from the X2 position to the position X3 as illustrated in FIG. 12, no collision-inhibiting operation is performed. However, when the detected object is recognized as having moved from the trailer zone TA to outside the trailer zone within the warning zones 72R, 72L, and the detected object remains outside the trailer zone TA for a predefined period of time or longer, the collision-inhibiting operation is performed.

The trailer zone TA is set based on results of detection by the radar devices 21. Specifically, as illustrated in FIG. 12, the trailer zone TA is set so as to include a plurality of detection points based on detection points corresponding to the trailers 50 detected by the radar devices 21. It is also possible to set the trailer zone TA using information other than radar detection information. For example, the trailer zone TA may be set based on input information from a user or trailer information transmitted from the trailer 50.

Figure 13:
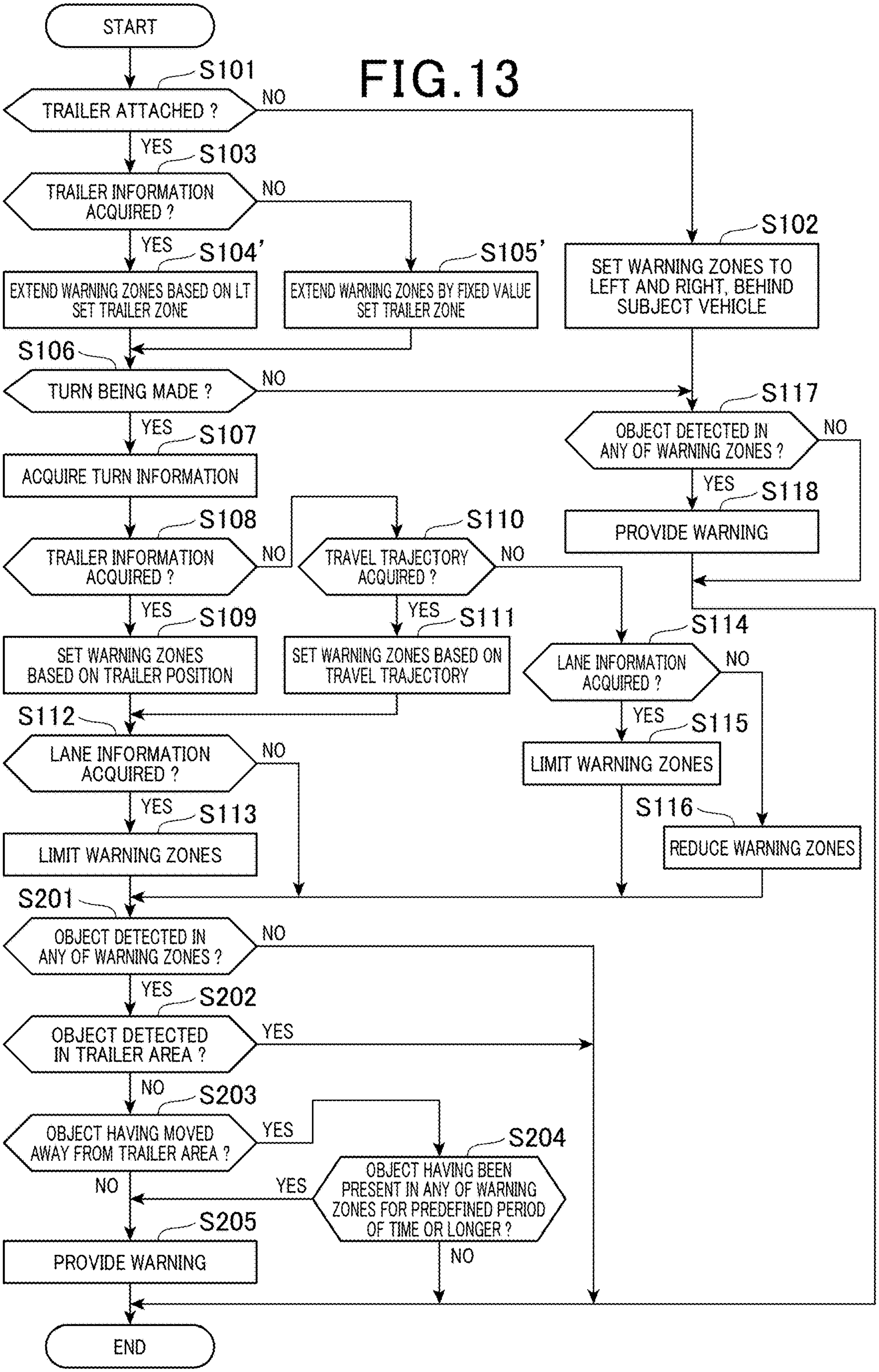
FIG. 13 is a flowchart of process steps for controlling the collision-inhibiting operation.

In the present embodiment, the ECU 30 performs control of the collision-inhibiting operation using the process illustrated in FIG. 13 instead of the process illustrated in FIG. 11. The process illustrated in FIG. 13 is performed repeatedly at predefined time intervals.

In FIG. 13, additional steps S201 through S205 are performed as compared to the flowchart in FIG. 10. In addition, at step S104', the trailer zone TA is additionally set after the warning zones are extended in the similar manner as in step S104, and at step S105', the trailer zone TA is additionally set after the warning zones are extended in the similar manner as in step S105.

In FIG. 13, after the warning zones 71 are set at steps S107 to S116 during a turn of the subject vehicle 40, the ECU 30 proceeds to step S201. At step S201, the ECU 30 determines whether an object has been detected by the radar devices 21 in any of the warning zones set at steps S107 to S116. If an object has been detected in any of the warning zones, the ECU 30 proceeds to step S202. If no object has been detected in the warning zones, the ECU 30 terminates the process without providing a warning via the warning device 27.

At step S202, the ECU 30 determines whether an object has been detected in the trailer zone TA. If an object has been detected in the trailer zone TA, that is, if an object has been detected in an area overlapping the trailer zone TA, of any of the warning zones 72R, 72L in FIG. 12, then answer is "YES" at step S202, and the ECU terminates this process without providing a warning via the warning device 27.

If no object has been detected in the trailer zone TA, that is, if an object has been detected in an area outside the trailer zone, which does not overlap the trailer zone TA, of any of the warning zones 72R, 72L, the ECU 30 proceeds to step S203. At step S203, the ECU 30 determines whether the object detected in the area outside the trailer zone, of any of the warning zones 72R, 72L, is recognized as having moved from the trailer region TA to the area outside the trailer zone. If the answer is NO at step S203, the ECU 30 proceeds to step S205 and provides a warning via the warning device 27.

On the other hand, if the answer is YES at step S203, the ECU 30 proceeds to step S204 and determines whether the object has remained in any of the warning zones 72R, 72L for a predefined period of time or longer. If the object has remained in the warning zones 72R, 72L for a predefined period of time or longer, the ECU 30 proceeds to step S205, provides a warning via the warning device 27, and terminates the process. If the object only has remained for less than the predefined period of time, the ECU 30 terminates the process without providing a warning via the warning device 27. In the present embodiment, the control unit 34 in the ECU 30 (see FIG. 1) is responsible for performing steps S201-205.

The present embodiment described in detail above can provide the following advantages.

The collision-inhibiting operation is not performed when an object is detected in an area overlapping the trailer zone TA, of any of the warning zones 72L and 72R. This can suppress unnecessary collision-inhibiting operations from being performed even when any of the warning zones enters the trailer zone TA during a turn of the subject vehicle 40.

When an object detected in an area outside the trailer zone, of any of the warning zones 72R, 72L, is recognized as having moved from the trailer zone TA, the collision-inhibiting operation is not performed. This can prevent unnecessary collision-inhibiting operations from being performed when the detected position of the object is recognized as having moved from the trailer zone TA to an area outside the trailer zone, of any of the warning zones 72R, 72L due to multiple reflections. Therefore, implementation of unnecessary collision-inhibiting operations due to multiple reflections can be restricted.

When an object detected in an area outside the trailer zone, of any of the warning zones 72R, 72L, is recognized as having moved from the trailer zone TA and has remained in any of the warning zones for a predefined period of time or longer, the collision-inhibiting operation is performed. This allows the collision-inhibiting operation to be performed appropriately according to whether the object detection is a false detection due to multiple reflections or a normal detection.

Other Embodiments

The above embodiment may be modified as follows.

(A1) In the first embodiment, the first to fourth processes are selectively performed, but this may be changed. For example, in one alternative, only one of the first to fourth processes may be performed. In another alternative, two or three of the first to fourth processes may be performed in combination.

(A2) When performing the process of truncating the rear end portion of each of the warning zones 72R and 72L in the longitudinal direction (in the fourth process), the warning zones 72R and 72L may be reset to the warning zones 71R and 71L in the state where the trailer 50 is not attached to the rear of the subject vehicle 40.

(A3) When performing the process (the fourth process) of truncating the rear end portion of each of the warning zones 72R and 72L in the longitudinal direction, lengths of the truncated rear end portions of the warning zones 72R and 72L in the longitudinal direction may be different. For example, during a turn of the subject vehicle 40, the length of the truncated rear end portion of the warning zone at the inside of the turn is made longer than the length of the truncated rear end portion of the warning zone at the outside of the turn. That is, the length of the extended warning zone at the inside of the turn is made shorter than the length of the extended warning zone at the outside of the turn.

(A4) In each of the above embodiments, the warning zones are set to both sides of the subject vehicle 40. In one alternative, only one warning zone may be set to one side of the subject vehicle 40. For example, in a case where the subject vehicle is traveling on a two-way road having two lanes for each direction, the warning zone may be set in the adjacent lane that is different from the lane in which the subject vehicle is traveling.

(A5) In the second embodiment, when the subject vehicle 40 with the trailer attached thereto makes a turn, in addition to the process of setting the warning zones 72L and 72R using any of the first to fourth processes, the collision-inhibiting operation in the trailer zone TA is restricted, but this configuration may be changed. For example, when the subject vehicle 40 with the trailer attached thereto makes a turn, the process of setting the warning zones 72L, 72R using any of the first to fourth processes may be omitted, and only the process of restricting the collision-inhibiting operation in the trailer zone TA may be performed. In this case, steps S107 to step S116 in FIG. 13, that is, the process of setting the warning zones 72L, 72R using the first to fourth processes, may be omitted, and control of the collision-inhibiting operation may be performed.

In addition, in a configuration where only the process of restricting the collision-inhibiting operation in the trailer zone TA is performed, determining whether the subject vehicle is turning may be omitted. For example, in a situation where the subject vehicle is running straight, the collision-inhibiting operation may be restricted. In this case, step S106 in FIG. 13 may be omitted, and control of the collision-inhibiting operation may be performed.

(A6) In each of the above embodiments, the collision-inhibiting operation includes providing a warning via the warning device 27, but this may be modified. For example, the collision-inhibiting operation may include any of door locking by a door locking device, braking of the subject vehicle by a brake device, and steering of the subject vehicle by a steering device.

(A7) Detection devices other than the radar devices 21 may be used for detecting objects in the warning zones. For example, LiDAR or the like using laser light as a transmission wave may be used as a detection device.

(A8) The surroundings monitoring device and the method thereof described in the present disclosure may be realized by a dedicated computer provided by configuring a processor and memory programmed to perform one or more functions embodied in a computer program. Alternatively, the surroundings monitoring device and the method thereof described in the present disclosure may be realized by a dedicated computer provided by configuring a processor with one or more dedicated hardware logic circuits. Alternatively, the surroundings monitoring device and the method thereof described in the present disclosure may be realized by one or more dedicated computers configured by a combination of a processor and memory programmed to perform one or more functions, and a processor configured with one or more hardware logic circuits. In addition, the computer program may be stored in a computer-readable, non-transitory tangible storage medium as instructions to be executed by a computer.

Although the present disclosure has been described in accordance with the above-described embodiments, it is not limited to such embodiments, but also encompasses various variations and variations within equal scope. In addition, various combinations and forms, as well as other combinations and forms, including only one element, more or less, thereof, are also within the scope and idea of the present disclosure.

What is claimed is:

1. A surroundings monitoring device for a vehicle to which a towed vehicle is attachable, comprising:

a turn information acquisition unit configured to, when a subject vehicle is turning with the towed vehicle attached to a rear of the subject vehicle, acquire turn information related to the subject vehicle and the towed vehicle, the subject vehicle being a vehicle that the surroundings monitoring device is applied to;

a zone setting unit configured to set warning zones to left and right, behind the subject vehicle, and extend, based on the turn information acquired by the turn information acquisition unit, the warning zones further rearward when the towed vehicle is attached to the rear of the subject vehicle than when there is no towed vehicle attached; and a control unit configured to, when an object is detected by a detection device in any of the warning zones set by the zone setting unit, trigger a collision-inhibiting operation for inhibiting a collision with the object to be performed, wherein the turn information acquisition unit is configured to acquire, as the turn information, a position of the towed vehicle that changes as the subject vehicle turns, and the zone setting unit is configured to set the warning zones to the left and right, behind the subject vehicle based on the position of the towed vehicle acquired by the turn information acquisition unit, the turn information acquisition unit is configured to acquire, in addition to the position of the towed vehicle that changes as the subject vehicle turns, a travel trajectory of the subject vehicle during a turn of the subject vehicle, and the zone setting unit is configured to, when the position of the towed vehicle has not been acquired as the turn information, set the warning zones to extend in a direction along the travel trajectory of the subject vehicle acquired by the turn information acquisition unit.

2. The surroundings monitoring device according to claim 1, wherein the zone setting unit is configured to, when neither the position of the towed vehicle nor the travel trajectory of the subject vehicle has been acquired as the turn information, truncate a rear end portion of each of the warning zones.

3. The surroundings monitoring device according to claim 1, wherein the turn information acquisition unit is configured to acquire, as the turn information, a travel trajectory of the subject vehicle during a turn of the subject vehicle, and the zone setting unit is configured to set the warning zones so as to extend in a direction along the travel trajectory of the subject vehicle acquired by the turn information acquisition unit.

4. The surroundings monitoring device according to claim 1, further comprising:

a lane information acquisition unit configured to acquire lane information related to a road including a subject-vehicle's lane that is a lane in which the subject vehicle is traveling, wherein the zone setting unit is configured to recognize an adjacent lane to the subject-vehicle's lane based on the lane information, and set an area of any of the warning zones, on an opposite side of the adjacent lane from the subject-vehicle's lane, as a restriction area where implementation of the collision-inhibiting operation is restricted.

5. The surroundings monitoring device according to claim 1, wherein the zone setting unit is further configured to set a towed-vehicle zone including an area occupied by the towed vehicle, and the control unit is configured to, even when the object is detected in an area of any of the warning zones, overlapping the towed-vehicle zone while the subject vehicle is turning with the towed vehicle attached to the rear of the subject vehicle, restrict the collision-inhibiting operation from being performed.

6. The surroundings monitoring device according to claim 1, wherein the subject vehicle is equipped with, as the detection device, a ranging sensor configured to transmit a probe wave and receive its reflected wave, the zone setting unit is further configured to set a towed-vehicle zone including an area occupied by the towed vehicle, and the control unit is further configured to, when recognizing that the object detected by the ranging sensor has moved from the towed-vehicle zone to an area outside the towed-vehicle zone and within any of the warning zones, restrict the collision-inhibiting operation from being performed.

7. The surroundings monitoring device according to claim 6, wherein the control unit is configured to, when the object detected by the ranging sensor, recognized as having moved from the towed-vehicle zone to the area outside the towed-vehicle zone and within any of the warning zones, remains outside the towed-vehicle zone for a predefined period of time or longer, trigger the collision-inhibiting operation to be performed.

8. A surroundings monitoring device for a vehicle to which a towed vehicle is attachable, comprising:

a zone setting unit configured to set warning zones to left and right, behind a subject vehicle and a towed-vehicle zone including an area occupied by the towed vehicle, and extend the warning zones further rearward when the towed vehicle is attached to the rear of the subject vehicle than when there is no towed vehicle attached, the subject vehicle being a vehicle that the surroundings monitoring device is applied to; and a control unit configured to, when an object is detected by a detection device in any of the warning zones set by the zone setting unit, trigger a collision-inhibiting operation for inhibiting a collision with the object to be performed, the control unit being further configured to, even when the object is detected in an area of any of the warning zones, overlapping the towed-vehicle zone while the subject vehicle is turning with the towed vehicle attached to the rear of the subject vehicle, restrict the collision-inhibiting operation from being performed, and a turn information acquisition unit configured to, when a subject vehicle is turning with the towed vehicle attached to a rear of the subject vehicle, acquire turn information related to the subject vehicle and the towed vehicle, the turn information including a position of the towed vehicle that changes as the subject vehicle turns, and a travel trajectory of the subject vehicle during a turn of the subject vehicle, wherein the zone setting unit is configured to, when the position of the towed vehicle has not been acquired as the turn information, set the warning zones to extend in a direction along the travel trajectory of the subject vehicle acquired by the turn information acquisition unit.

9. The surroundings monitoring device according to claim 8, wherein the subject vehicle is equipped with, as the detection device, a ranging sensor configured to transmit a probe wave and receive its reflected wave, and the control unit is further configured to, when recognizing that the object detected by the ranging sensor has moved from the towed-vehicle zone to an area outside the towed-vehicle zone and within any of the warning zones, restrict the collision-inhibiting operation from being performed.

10. The surroundings monitoring device according to claim 9, wherein the control unit is configured to, when the object detected by the ranging sensor, recognized as having moved from the towed-vehicle zone to the area outside the towed-vehicle zone and within any of the warning zones, remains outside the towed-vehicle zone for a predefined period of time or longer, trigger the collision-inhibiting operation to be performed.

11. A non-transitory computer readable medium having stored thereon instructions executable by a computer to cause the computer to perform a surroundings monitoring method for a vehicle to which a towed vehicle is attachable, the surroundings monitoring method comprising:

when a subject vehicle is turning with the towed vehicle attached to a rear of the subject vehicle, acquiring turn information related to the subject vehicle and the towed vehicle, the subject vehicle being a vehicle that the surroundings monitoring device is applied to;

setting warning zones to left and right, behind the subject vehicle, and extending, based on the turn information acquired, the warning zones further rearward when the towed vehicle is attached to the rear of the subject vehicle than when there is no towed vehicle attached; and when an object is detected by a detection device in any of the warning zones, triggering a collision-inhibiting operation for inhibiting a collision with the object to be performed, and acquiring turn information including a position of the towed vehicle that changes as the subject vehicle turns, and a travel trajectory of the subject vehicle during a turn of the subject vehicle, wherein the setting warning zones includes setting the warning zones to the left and right, behind the subject vehicle based on the position of the towed vehicle, and when the position of the towed vehicle has not been acquired as the turn information, setting the warning zones to extend in a direction along the travel trajectory of the subject vehicle.

12. A surroundings monitoring device for a vehicle to which a towed vehicle is attachable, comprising:

a turn information acquisition unit configured to, when a subject vehicle is turning with the towed vehicle attached to a rear of the subject vehicle, acquire turn information related to the subject vehicle and the towed vehicle, the subject vehicle being a vehicle that the surroundings monitoring device is applied to;

a zone setting unit configured to set warning zones to left and right, behind the subject vehicle, and extend, based on the turn information acquired by the turn information acquisition unit, the warning zones further rearward when the towed vehicle is attached to the rear of the subject vehicle than when there is no towed vehicle attached; and a control unit configured to, when an object is detected by a detection device in any of the warning zones set by the zone setting unit, trigger a collision-inhibiting operation for inhibiting a collision with the object to be performed, a lane information acquisition unit configured to acquire lane information related to a road including a subject-vehicle's lane that is a lane in which the subject vehicle is traveling, wherein the zone setting unit is configured to recognize an adjacent lane to the subject-vehicle's lane based on the lane information, and set an area of any of the warning zones, on an opposite side of the adjacent lane from the subject-vehicle's lane, as a restriction area where implementation of the collision-inhibiting operation is restricted.

* * * * *